(12) United States Patent
Srinivasan et al.

(10) Patent No.: US 11,985,061 B1
(45) Date of Patent: May 14, 2024

(54) DISTRIBUTED LOOK-AHEAD ROUTING IN NETWORK-ON-CHIP

(71) Applicant: XILINX, INC., San Jose, CA (US)

(72) Inventors: Krishnan Srinivasan, San Jose, CA (US); Abbas Morshed, Los Altos, CA (US); Aman Gupta, Santa Clara, CA (US); Sagheer Ahmad, Cupertino, CA (US)

(73) Assignee: XILINX, INC., San Jose, CA (US)

( * ) Notice: Subject to any disclaimer, the term of this patent is extended or adjusted under 35 U.S.C. 154(b) by 385 days.

(21) Appl. No.: 17/227,258

(22) Filed: Apr. 9, 2021

(51) Int. Cl.
| | | |
|---|---|---|
| *H04L 45/302* | (2022.01) | |
| *G06F 15/78* | (2006.01) | |
| *H04L 45/00* | (2022.01) | |
| *H04L 45/42* | (2022.01) | |
| *H04L 45/745* | (2022.01) | |

(52) U.S. Cl.
CPC ........ *H04L 45/302* (2013.01); *G06F 15/7825* (2013.01); *H04L 45/42* (2013.01); *H04L 45/566* (2013.01); *H04L 45/745* (2013.01); *H04L 45/34* (2013.01)

(58) Field of Classification Search
CPC ..... H04L 45/302; H04L 45/42; H04L 45/566; H04L 45/745; H04L 45/34; G06F 15/7825
See application file for complete search history.

(56) References Cited

U.S. PATENT DOCUMENTS

| | | | | |
|---|---|---|---|---|
| 7,266,683 | B1* | 9/2007 | Nag | H04L 63/0428 713/150 |
| 2002/0078224 | A1* | 6/2002 | Brueckner | H04L 12/43 709/250 |
| 2015/0188847 | A1* | 7/2015 | Chopra | H04L 45/306 370/401 |
| 2016/0241492 | A1* | 8/2016 | Nguyen | H04L 49/109 |
| 2017/0286099 | A1* | 10/2017 | Wilkinson | G06F 8/65 |
| 2022/0311691 | A1* | 9/2022 | Biradar | G06F 16/2255 |

\* cited by examiner

*Primary Examiner* — Hassan A Phillips
*Assistant Examiner* — Anthony Luo
(74) *Attorney, Agent, or Firm* — Patterson + Sheridan, LLP

(57) ABSTRACT

Embodiments herein describe an integrated circuit that includes a network on chip (NoC) where an egress logic block or switch performs a route lookup for a subsequent (e.g., downstream) switch in the NoC (referred to herein as look-ahead routing). After receiving the packet and a port ID from the egress logic block or the switch, the downstream switch knows, without performing route lookup of its own, on which port it should forward the packet. Thus, if the downstream switch performs other functions that are dependent on knowing the destination port (e.g., arbitration or QoS updating), the downstream switch can perform those functions immediately since the port ID was already determined by, and received from, the previous network element.

20 Claims, 6 Drawing Sheets

DISTRIBUTED LOOK-AHEAD ROUTING IN NETWORK-ON-CHIP

TECHNICAL FIELD

Examples of the present disclosure generally relate to performing look-ahead routing for a network on chip (NoC).

BACKGROUND

A system on chip (SoC) (e.g., a field programmable gate array (FPGA), a programmable logic device (PLD), or an application specific integrated circuit (ASIC)) can contain a packet network structure known as a network on chip (NoC) to route data packets between logic blocks in the SoC—e.g., programmable logic blocks, processors, memory, and the like.

The NoC can include ingress logic blocks (e.g., primary circuits) that execute read or write requests to egress logic blocks (e.g., secondary circuits). When receiving a packet, switches in the NoC are tasked with determining the next hop (e.g., the next switch) to forward the packet to using a destination ID in the switch. The switch may also have to perform other functions that are dependent on determining the route such as arbitration or Quality of Service (QoS) updates. That is, the functions may have to be performed sequentially.

To reduce latency, ideally, the switches operate as fast as they can to determine the next hop in the NoC and perform the other functions. However, the fact these functions are dependent on each other and must be performed sequentially limits the operation frequency of the switches.

SUMMARY

Techniques for performing look-ahead routing in a NoC are described. One example is an integrated circuit that includes a first hardware entity, a second hardware entity, and a NoC providing connectivity between the first and second hardware entities. The NoC includes an ingress logic block coupled to the first hardware entity, an egress logic block coupled to the second hardware entity, and a plurality of switches coupled between the ingress and egress logic blocks where at least one of the ingress logic block or one of the plurality of switches is configured to perform look-ahead routing by determining a port ID for a downstream switch to use when forwarding a packet and forward the port ID and the packet to the downstream switch.

One example described herein is a method that includes providing a NoC in an integrated circuit the NoC including a plurality of switches connecting ingress logic blocks to egress logic blocks, receiving a packet at a first network element in the NoC the first network element including one of the ingress logic blocks or one of the plurality of switches, performing look-ahead routing at the first network element by determining a port ID for a downstream switch to use when forwarding a packet, and forwarding the port ID and the packet to the downstream switch from the first network element.

One example described herein is an integrated circuit that includes a NoC that includes an ingress logic block, an egress logic block, and a plurality of switches coupled between the ingress and egress logic blocks. At least one of the ingress logic block or one of the plurality of switches is configured to perform look-ahead routing by determining a port ID for a subsequent switch of the plurality of switches to use when forwarding a packet and forward the port ID and the packet to the subsequent switch.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
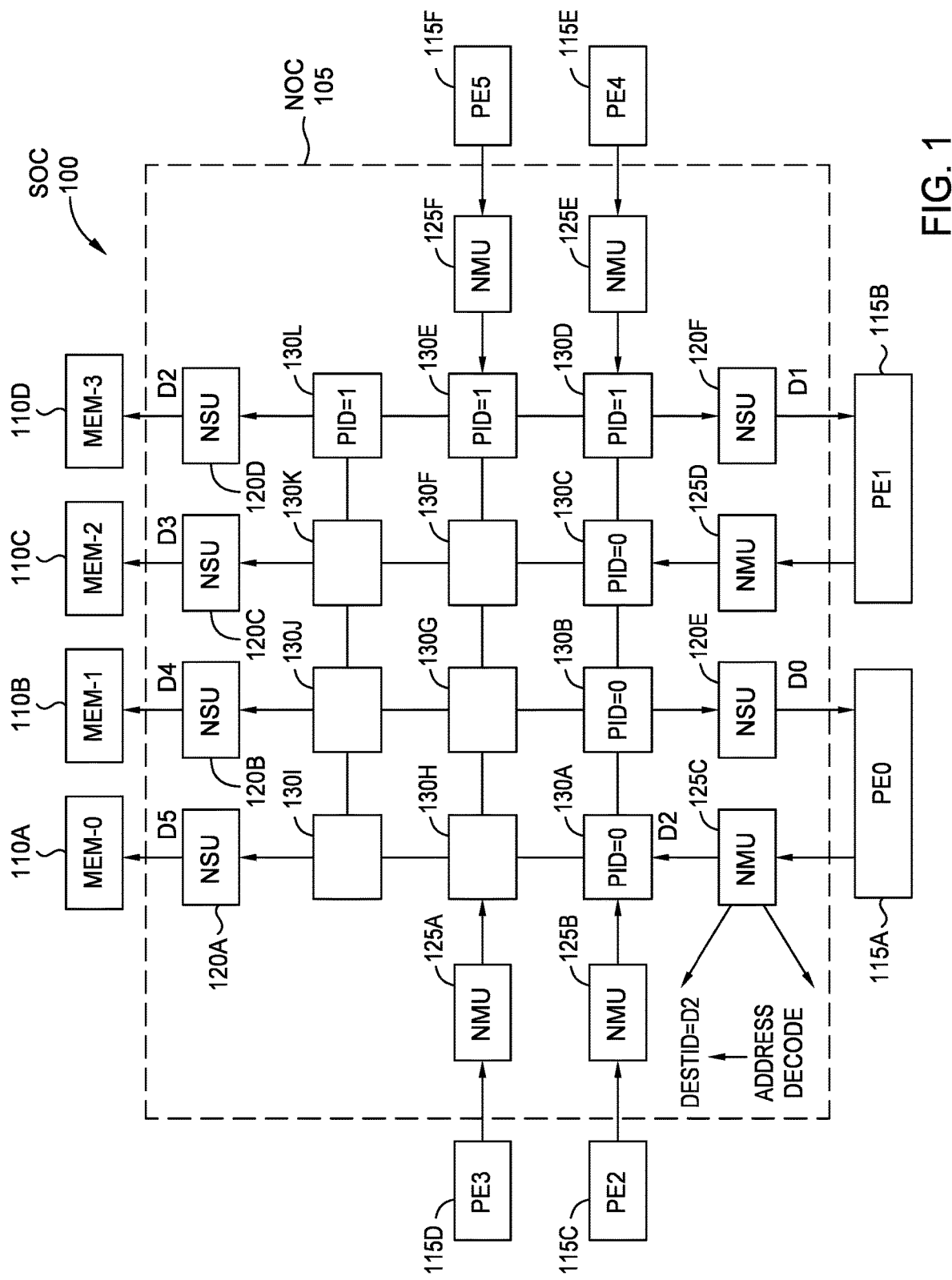
FIG. 1 is a block diagram of a SoC containing a NoC, according to an example.

Various features are described hereinafter with reference to the figures. It should be noted that the figures may or may not be drawn to scale and that the elements of similar structures or functions are represented by like reference numerals throughout the figures, it should be noted that the figures are only intended to facilitate the description of the features, They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe an integrated circuit (e.g., a SoC) that includes a NoC where an egress logic block or switch performs a route lookup for a subsequent (e.g., downstream) switch in the NoC (referred to herein as look-ahead routing). For example, a first switch in the NoC may include a routing table that indicates on which port the next (second) switch should forward the packet. The first switch can then forward the packet and a port ID for the port to the second switch. Thus, the second switch can know, without performing route lookup of its own, on which port it should forward the packet. Thus, if the second switch performs other functions that are dependent on knowing the destination port (e.g., packet arbitration and QoS updating), the second switch can perform those functions immediately since the port ID was already determined by, and received from, the first switch. As a result, this means the time required for the second switch to perform its functions is reduced.

In one embodiment, the second switch includes a routing table that indicates on which port the next switch (e.g., a third switch) should forward the packet. That is, much like how the first switch performed look-ahead routing for the second switch, the second switch can perform look-ahead routing for the third switch. The advantage of doing so is that this route lookup can be performed in parallel with the other functions being performed by the second switch (e.g., arbitration and QoS), Thus, performing look-ahead routing on the second switch for the third switch does not require any additional time (or only a small additional time) since it can be performed at the same time the second switch performs its other tasks. As such, this permits the clock cycle time to be reduced (or the operation frequency to be increased) relative to a system with each switch performs its own route lookup. Alternatively, instead of reducing the cycle time, performing look-ahead routing can permit the switches to perform other functions they otherwise would not be able to do during a single clock cycle such as implementing redundancy measures or signal integrity measures (e.g., Data Bus Inversion).

Further, an egress logic block or switch may perform route lookup for multiple downstream switches to identify the port IDs they should use to forward the packet. This may result in some of the switches in the NoC not performing route lookup at all (for themselves or for another switch), While doing so may require additional wires between the switches to carry the additional port IDs, the switches can also be made smaller which may reduce the overall area required by the NoC in the integrated circuit.

FIG. 1 is a block diagram of a SoC 100 containing a NoC 105, according to an example. In one embodiment, the SoC 100 is implemented using a single integrated circuit (IC). In one embodiment, the SoC 100 includes only hardened circuitry in an ASIC. In another embodiment, the SoC 100 includes a mix of hardened and programmable logic. Nonetheless, the NoC 105 may be formed using hardened circuitry rather than programmable circuitry so that its footprint in the SoC 100 is reduced.

As shown, the NoC 105 interconnects processing elements (PEs) 115, and memories 110. The PEs 115 can include programmable logic blocks or hardened processors. That is, the NoC 105 can be used in the SoC 100 to permit different hardened and programmable circuitry elements in the SoC 100 to communicate. For example, the PE 115A may use one NoC Master Unit 125C (e.g., an ingress logic block) to communicate with the memory 110D. Although as shown being connected to on NMU 125, the PEs 115 can couple to multiple NMUs 125. In either case, in another embodiment, the PE 125A may use the same NMU 125C to communicate with both the memory 110D and the PE 115B (assuming the endpoints use the same communication protocol). During configuration, a compiler determines the data paths the PEs 115 use in the NoC 105 to communicate with the memories 110 and the other PE 115. That is, the paths may be set before the NoC begins to operate and do not change unless the NoC 105 is reconfigured. Thus, each time the PE 115A transmits data to the memory 110D, it will use the same path through the NoC 105, until the NoC 105 is reconfigured.

To route the data, the NoC 105 includes switches 130 that have connections between themselves and the ingress logic blocks (e.g., the NMUs 125) and egress logic blocks (e.g., NoC Slave Units (NSUs) 120). When the PE 115A sends a packet to the NMU 125C that it wants to reach the memory 110D, the NMU 125C determines a destination ID corresponding to the NSU 120D connected to the memory 110D. In current NoCs, each switch 130 receives the packet containing the destination ID and uses the destination ID to determine on which port it should use to forward the packet to the next switch. However, in the embodiments herein, one or more switches 130, the NMU 125, or both, perform look ahead routing where the switch 130 or NMU 125 determines on which port the next switch should forward the packet. A port ID corresponding to that port is then forwarded, along with the packet, to the next switch. Thus, the receiving switch 130 does not need to perform route lookup to determine which of its ports the switch 130 should use to forward the packet, but the switch 130 may perform a route lookup for the next switch 130.

In FIG. 1, the switches 130 each have four ports (east, north, west, and south ports labeled 0, 1, 2, and 3, respectively). The compiler has configured a path in the NoC 105 which the PE 115A can use to communicate with the memory 110D by forwarding the packet through the NMU 125C, the switches 130A-E, 130L, and the NSU 120D. To perform look-ahead routing, the NMU 125C may determine that the switch 130A should use Port 0 (the east port) to forward the packet so the packet reaches the switch 130B. The NMU 125C can send the ID for Port 0 to the switch 130A along with the corresponding packet. Similarly, the switch 130A may perform look-ahead routing to determine that the switch 130B should use Port 0 to forward the packet so the packet reaches the switch 130C, and so forth until the packet eventually reaches the NSU 120D, As discussed in more detail below, the NMUs 125 and switches 130 can include routing tables which can be indexed into using the destination ID of the packet in order to perform look-ahead routing—i.e., determine which port a subsequent, downstream switch should use to forward the packet.

While the NoC 105 can be configured to permit the PEs 115 to communicate with all the other hardware logic blocks that are also connected to the NoC 105, in other embodiments, the PEs 115 may communicate with only a sub-portion of the other hardware logic blocks (e.g., other PEs and the memories 110) connected to the NoC 105. For example, for one configuration of the NoC 105, the PE 115D may be able to communicate with the PE 115A but not with the PE 115B, or with only a subset of the memories 110. However, the NoC 105 may be reconfigured such that the PE 115D has established communication paths in the NoC 105 with all these hardware elements.

In one embodiment, the SoC 100 is an FPGA which configures the PEs 115 according to a user design, That is, in this example, the FPGA includes both programmable and hardened logic blocks. However, in other embodiments, the SoC 100 may be an ASIC that includes only hardened logic blocks, That is, the SoC 100 may not include programmable logic (PL) blocks in which case the PEs 115 are hardened processors or processing elements. Even though in that example the logic blocks are non-programmable, the NoC 105 may still be programmable to switch between different communication protocols, change data widths at the interface, or adjust the frequency.

Figures 2A, 2B:
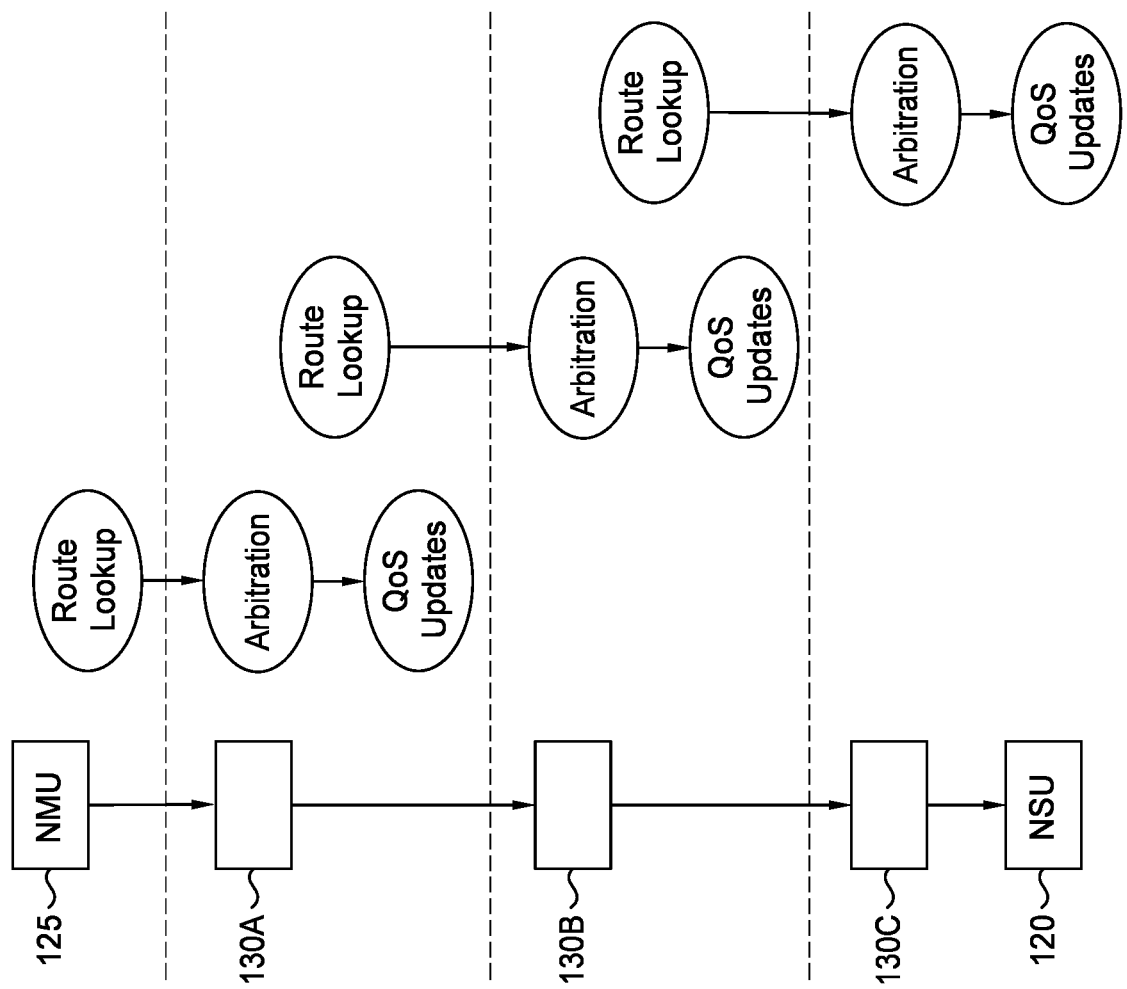
FIGS. 2A and 2B illustrate different schemes for performing routing in a NoC, according to examples.

FIGS. 2A and 2B illustrate different schemes for performing routing in a NoC, according to examples. In FIG. 2A the switch 130B does not perform look-ahead routing while in FIG. 2B the NMU 125, switch 130A, and switch 130B all perform look-ahead routing.

In FIG. 2A, the switch 130B receives a packet from the switch 130A and performs route lookup to determine on which port to forward the packet. For example, the switch 130 can use a destination ID in the packet to index into a routing table that indicates which port to use. In this case, the switch selects the port that is connected to the switch 130C.

Once route lookup is complete, the switch 130B can then perform arbitration and QoS updates on the packet. In this embodiment, these functions are dependent on route lookup. That is, arbitration and the QoS updates may result in different outcomes depending on the port identified during route lookup. Thus, arbitration and QoS update are performed after, or sequentially, with route lookup, Put differently, the switch 130B may be unable to perform these functions in parallel. Because they are not performed in parallel, this increases the amount of time that is used to perform these functions relative to if these functions could be performed in parallel. This time may set a minimum clock cycle time or maximum operating frequency of the NoC that can be achieved.

In contrast, FIG. 2B illustrates look-ahead routing where an upstream element in the NoC determines which port a downstream element in the NoC should use to forward a packet. In this example, the NMU 125 determines which port the switch 130A should use to forward the packet, the switch 130A determines which port the switch 130B should use to forward the same packet, and the switch 130B determines which port the switch 130C should use to forward the same packet. Doing so breaks the data dependency between the route lookups and the other functions performed by the switches 130. For example, when the switch 130A receives the packet from the NMU 125, it also receives the ID of the port it should use to forward the packet, and thus, can immediately start to perform the arbitration and QoS updates for that packet. In parallel, the switch 130A can do look ahead routing for the next destination of the packet—i.e., the switch 130B. Thus, when forwarding the packet to the switch 130B, the switch 130A also informs the switch 130B which port it should use to forward the packet, which is the port coupled to the switch 130C. As such, the switch 130B can immediately begin its arbitration and QoS updates on the packet, while in parallel perform look-ahead routing for the switch 130C. Thus, the data dependency between the route lookup and the other functions performed by a particular switch is broken such that the route lookup (which is performed for a downstream switch) can be performed in parallel with the other functions.

The routing scheme illustrated in FIG. 2B may enable shorter clock cycles or faster operational frequencies than the scheme in FIG. 2A. Alternatively, the scheme in FIG. 2B may permit the switches 130 to perform additional functions on the packet while using the same clock cycles or operational frequencies as the scheme in FIG. 2A. For example, the extra time enabled by look-ahead routing may be used so the switches 130 can implement redundancy measures or signal integrity measures (e.g., Data Bus Inversion).

Moreover, not all of the switches 130 have to perform look-ahead routing. For example, only the NMU 125 and the switch 130A may perform look-ahead routing while the switch 130C performs its own route lookup when it receives the packet rather than getting a port ID from the switch 130B, Thus, the switch 130C may execute a routing scheme similar to the switch 130B in FIG. 2A.

Figure 3:
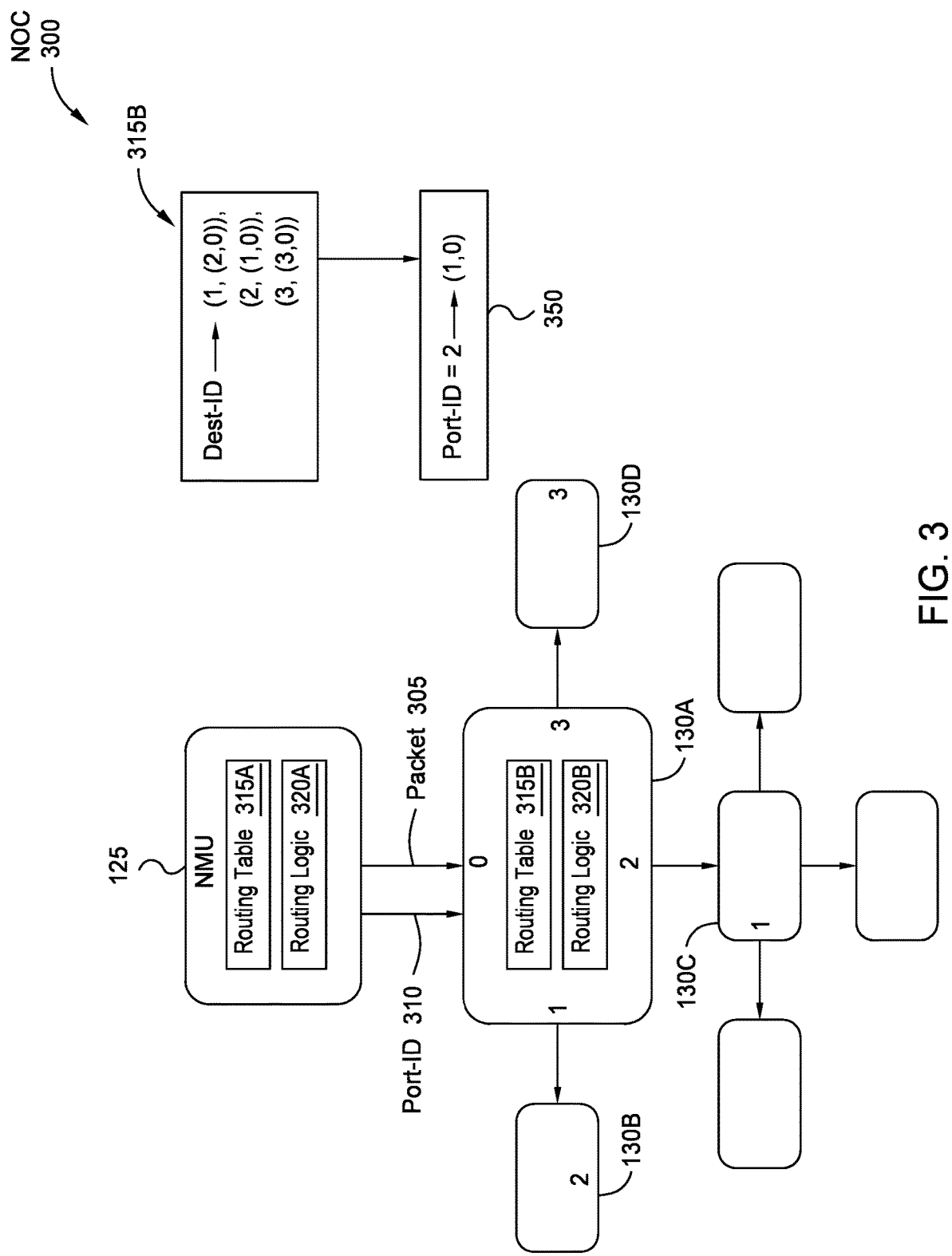
FIG. 3 illustrates a NoC where a first switch determines a forwarding port for a downstream stream, according to an example.

FIG. 3 illustrates a NoC 300 where a first switch 130A determines a forwarding port for a downstream stream, according to an example. In this example, the NMU 125 has already performed look-ahead routing to determine where the switch 130A should forward a packet. To do so, the NMU 125 has routing logic 320A (e.g., circuitry) that indexes into a routing table 315A using a destination ID in the packet. When configuring the NoC, a compiler can generate data for populating the routing table 315A so that it includes corresponding port IDs for the switch 130A for every possible destination. As discussed above, the data paths in the NoC may be fixed or known such that the NoC functions like a deterministic routing network. Thus, the compiler already knows which endpoints (e.g., the PEs and memories illustrated in FIG. 1) connected to the NoC will talk to each other during operation, and sets up the corresponding data paths for those endpoints. Using this information, the compiler can generate the data in the routing table 315A so that the routing logic 320A in the NMU 125 can determine which port should be used by the switch 130A depending on the destination of the packet.

As shown, the NMU 125 transmits a port ID 310 and the packet 305 to the switch 130A. That is, the NMU 125 transmits the port ID 310 identified by the routing logic 320A from performing look-ahead routing to the switch 130A (e.g., using a sideband channel) in addition to the packet 305. Thus, look-ahead routing uses more wires than if only the packet 305 was sent to the switch 130A.

The switch 130A includes its own routing logic 320B (e.g., circuitry) and routing table 315B for performing look-ahead routing for the switches coupled to it—i.e., the switches 136-D. FIG. 3 shows an example of the routing table 315B in the switch 130A. In this case, a destination ID (Dest-ID) in the received packet is used to index into the table 315B to determine the port ID for the next switch. The routing table 315B has three entries, one for each port on the switch 130, The first entry (1, (2,0)) indicates that if the received Port ID 310 is "1", then the next switch—i.e., switch 130B—should use its port 2 to forward the packet. The second entry (2, (1,0)) indicates that if the received Port ID 310 is "2", then the next switch—i.e., switch 130C— should use its port 1 to forward the packet. The third entry (3, (3,0)) indicates that if the received Port ID 310 is "3", then the next switch—i.e., switch 130D—should use its port 3 to forward the packet. Of course, this is just one example, and depends on how the compiler configured the NoC 300.

When receiving the packet 305, the switch 130A can immediately begin performing arbitration, QoS updates, and another other desired functions on the packet 305. In parallel, the routing logic 320B can use the received Port ID 310 to index into the routing table 315B to determine which port the next switch should use. In the example shown in the box 350, the Port ID 310 received at the switch 130A is a "2" indicating the switch 130A should forward the packet 305 on its port 2 to the switch 130C. As indicated in the box 350, the switch 130A uses the routing table 315B to perform look-ahead routing and determine that the switch 130C should use port 1 to forward the packet 305. Thus, when forwarding the packet 305 to the switch 130C, the switch 130A also transmits the Port ID for port 1 to the switch 130C so it immediately knows which port it will use to forward the packet.

Although not shown, each of the switches 130 in the NOC 300 can have their own routing table so that Port IDs received from upstream switches can be used to perform look-ahead routing for downstream switches.

Figure 4:
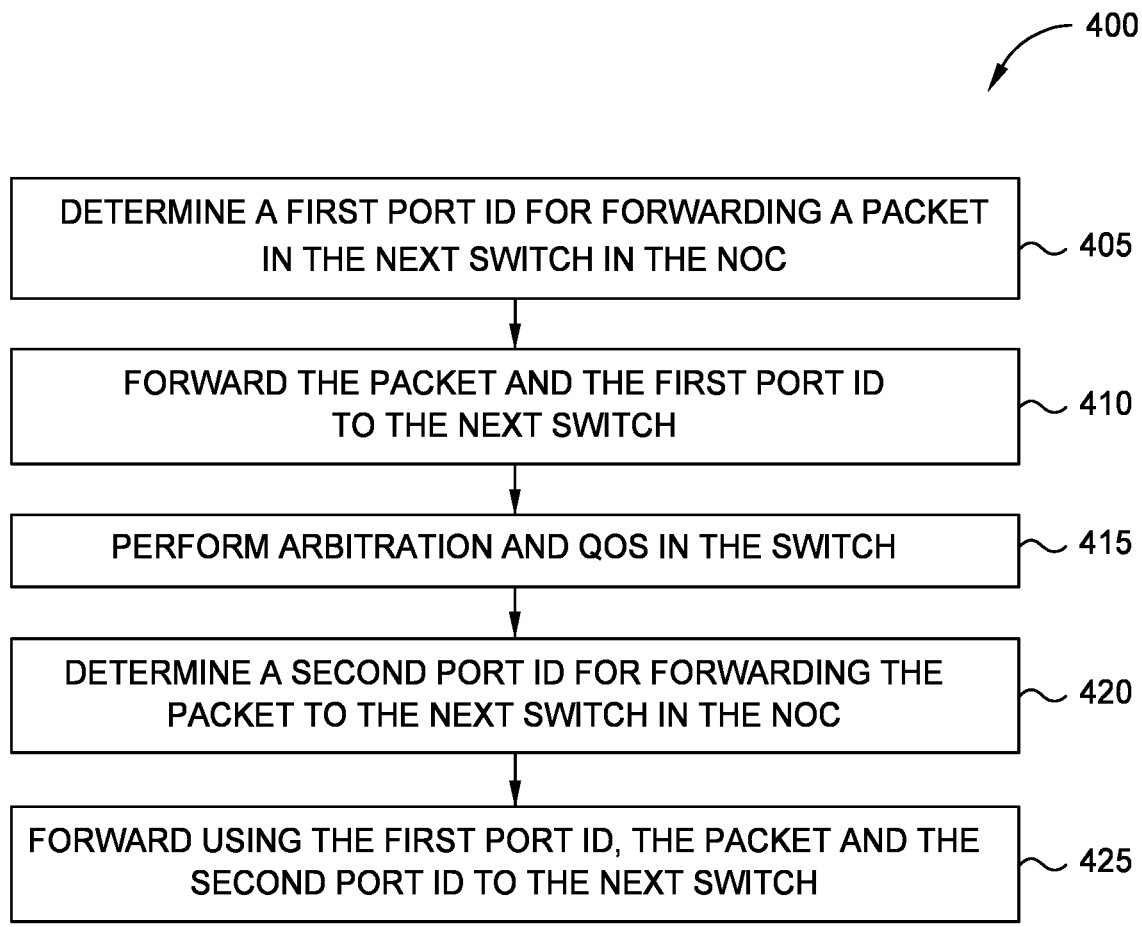
FIG. 4 is a flowchart for determining a forwarding port for a downstream switch in the NoC, according to an example.

FIG. 4 is a flowchart of a method 400 for determining a forwarding port for a downstream switch in the NoC, according to an example. At block 405, a network element in a NoC (e.g., a NMU or switch) determines a first port ID for forwarding a packet in the next switch in the NoC. In one embodiment, the destination ID in the packet can be used to determine the first port ID by indexing into a routing table. In other embodiments, the port ID received from an upstream network element can be used as an index into the routing table.

At block 410, the network element forwards the packet and the first port ID to the next switch. In one embodiment, the packet and the first port ID are transmitted on separate wires connecting the network element to the next switch. For example, the first port ID may be transmitted on a sideband channel while the packet is transmitted on a main channel between the network element and the switch.

At block 415, the switch (i.e., the next switch) performs arbitration and QoS, and other desired functions, corresponding to the received packet, Because the switch received the port ID indicated which port it should use to forward the packet, the arbitration and QoS can begin immediately—i.e., without waiting for route lookup.

At block 420, the switch determines a second port ID for forwarding the packet in the next switch in the NoC. Put differently, the switch performs look-ahead routing for the switch that is coupled to the port corresponding to the first port ID. Using FIG. 3 as an example, assuming the port ID 310 received from the NMU 125 is "1", the switch 130A performs look-ahead routing for the switch 130B (since that switch is coupled to port 1 of the switch 130A).

As discussed above, there may not be any data dependency between the arbitration and QoS functions performed at block 415 by the switch and the route lookup performed at block 420. Thus, blocks 415 and 420 can be performed in parallel in the switch.

At block 425, the switch forwards, using the port corresponding the first port ID, the packet and the second port ID to the next switch—i.e., the switch coupled to the port corresponding to the first port ID. In this manner a switch can perform look-ahead routing for the next switch in the data path. This can enable the switch to operate faster than it would otherwise, or to perform additional processing on the packet than it would have been able to otherwise.

In one embodiment, each upstream element in the NoC performs look-ahead routing for a downstream element in the NoC. For example, using the data path shown in FIG. 1 between the PE 115A and the Memory 110D, the NMU 125C can perform look-ahead routing for switch 130A, the switch 130A can perform look-ahead routing for the switch 130B, the switch 130B can perform look-ahead routing for the switch 130C which can continue for switches 130D and 130E. The switch 130L may not perform look-ahead routing for the NSU 120D since it only has one potential destination (i.e., memory 110D) so no route lookup is necessary.

However, in another embodiment, only a subportion of the network elements may perform look-ahead routing. In that case, the NMU 125C can perform look-ahead routing for switch 130A and the switch 130A can perform look-ahead routing for the switch 130B; however, the switches 130C, 130D, 130E, and 130L may perform their own route lookups. Or the switches 130A, 130B, and 130C may perform their own route lookups while the switch 130D may perform its own route lookup as well as perform look-ahead routing for the switch 130E which can in turn perform look-ahead routing for the switch 130L.

Figure 5:
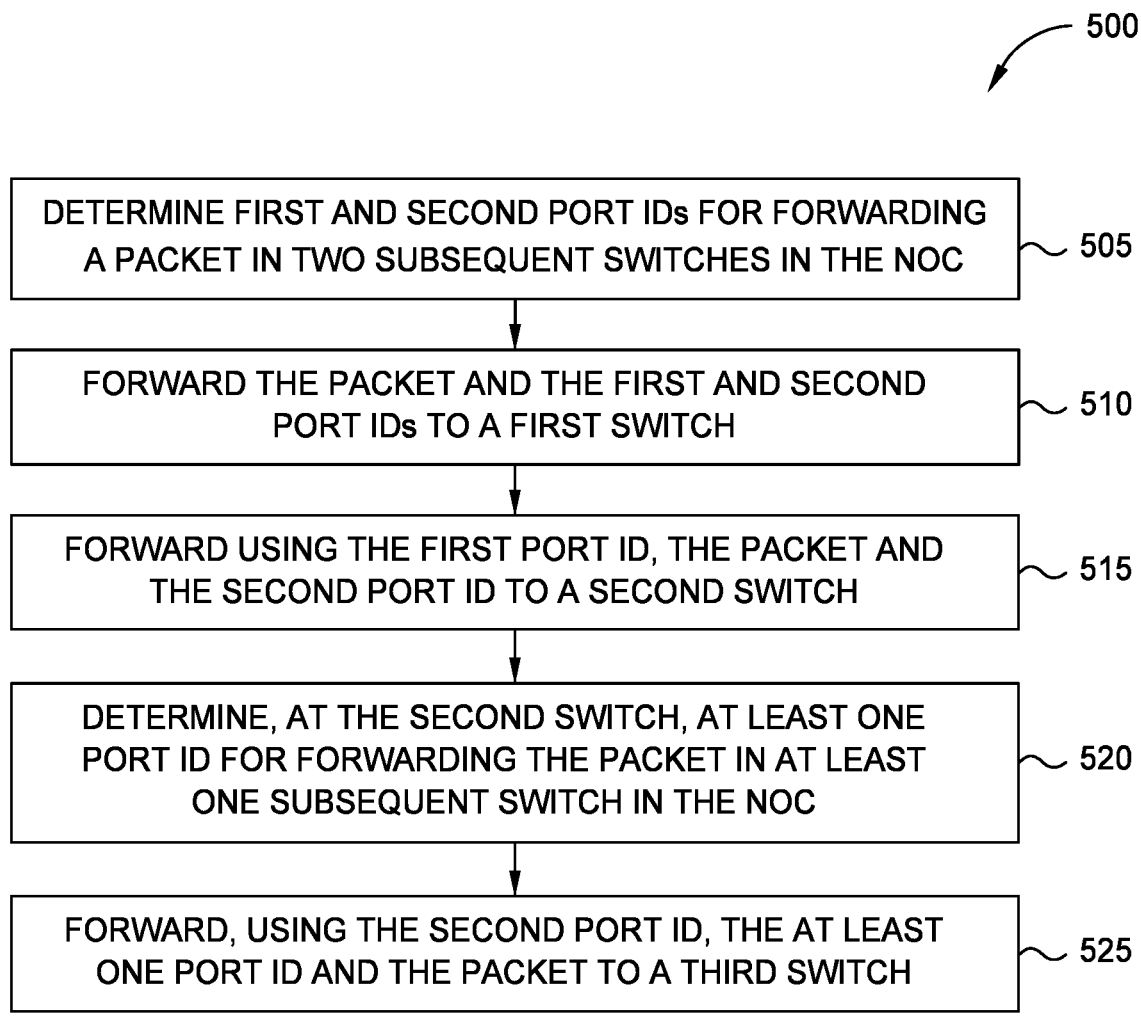
FIG. 5 is a flowchart for determining multiple forwarding ports for multiple downstream switches in the NoC, according to an example.

FIG. 5 is a flowchart of a method 500 for determining multiple forwarding ports for multiple downstream switches in the NoC, according to an example. In FIG. 4, a network element performs look-ahead routing for the next network element in the data path. In contrast, in FIG. 5 a network element performs look-ahead routing for multiple downstream elements in the data path through the NoC.

At block 505, a network element (e.g., a NMU or a switch) in the NoC determines first and second port IDs for forwarding a packet in two subsequent switches in the NoC. For example, the network element may have two routing tables, one for each of the subsequent switches, that can be indexed into using a destination ID corresponding to a packet. The network element can identify the two port IDs from the two routing tables. The first port ID instructs the next switch in the data path what port to use when forwarding the packet while the second port ID instructs the following switch in the data path what port to use when forwarding the same packet. In this manner, the network element performs look-ahead routing for the next two switches in the predefined data path.

At block 510, the network element forwards the packet and the first and second port IDs to a first switch. That is, the NoC has wires for transmitting both the data in the packet (e.g., a main channel) as well as wires for sending the first and second port IDs (e.g., two sideband channels).

At block 515, the first switch forwards, using the first port ID, the packet and the second port ID to a second switch. Because the first switch does not forward the first port ID to the second switch, the NoC can use less wires to communicate between the first and second switch than between the network element and the first switch.

In this example, the first switch may not perform any route lookup, either for itself or for a downstream switch (e.g., look-ahead routing). Thus, the first switch may have less circuitry (and require less area in the IC) than a switch that performs look-ahead routing or route lookup for itself. This space savings may be used to include circuitry in the first switch that performs other functions on the received packet, or to reduce the overall size of the NoC in the IC. The size of the network element used to identify the first and second port IDs at block 505 may be slightly larger since it performs look-ahead routing for multiple subsequent switches, but its size increase may be less than the space savings resulting from decreasing the size of the first switch.

The first switch can perform any number of functions on the packet such as arbitration and QoS which can begin immediately when the first switch receives the packet since the destination port is already known (i.e., the first port ID).

At block 520, the second switch determines at least one port ID for forwarding the packet in at least one subsequent switch in the NoC. That is, the second switch performs look-ahead routing for another switch in the data path (e.g., a third switch). The second switch can do this for one switch, or for multiple switches like the network element at block 505.

At block 525, the second switch forwards, using the second port ID, the at least one port ID determined during block 520 and the packet to a third switch. In this manner, the NoC can be flexibly configured where one switch (or NMU) performs look-ahead routing for several subsequent switches while another switch in the same data path performs look-ahead routing for a different number of switches (or does not perform any look-ahead routing). Alternatively, the network elements that perform look-ahead routing may determine the port IDs for the same number of switches in the data path.

Figure 6:
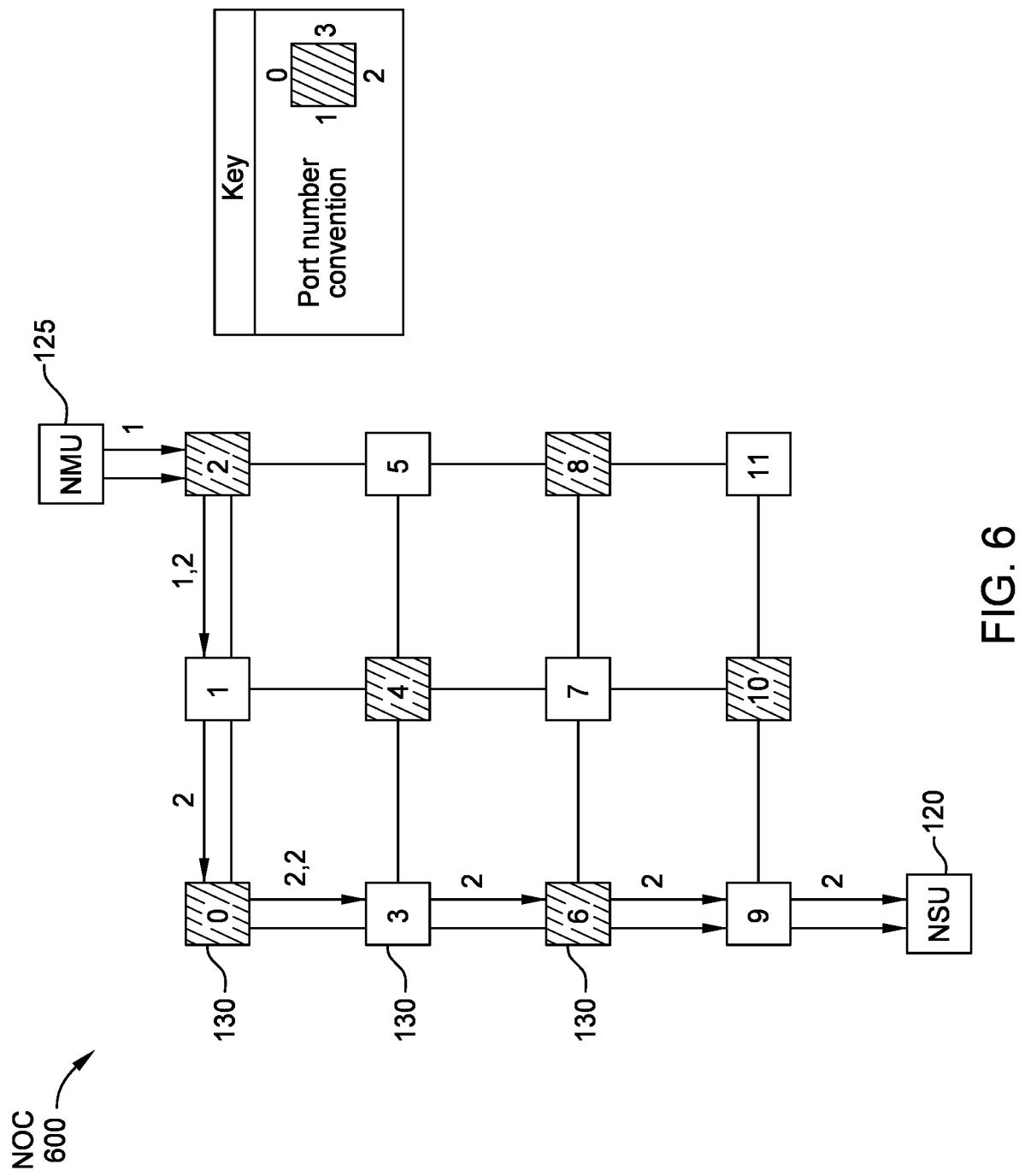
FIG. 6 illustrates a NoC where one switch determines forwarding ports for multiple downstream switches in the NoC, according to an example.

FIG. 6 illustrates a NoC 600 where one switch 130 determines forwarding ports for multiple downstream switches in the NoC 600, according to an example. For example, the NoC 600 includes the switches 130 (labeled 0-11). In this example, the switches 130 with the hashing perform look-ahead routing for two downstream switches while the switches 130 without the hashing do not perform route lookup. For example, assume the NoC 600 is configured with a data path that extends from the NMU 125, through the Switches 2, 1, 3, 6, and 9, until reaching the NSU 120. The NMU 125 forwards the packet to Switch 2 which in turn determines the port IDs that are to be used by both Switch 1 (port 1) and Switch 0 (port 2) when forwarding the packet. Thus, the connection between Switch 2 and Switch 1 includes extra wires (e.g., an extra nine bits) to transmit both port IDs to Switch 1. However, because Switch 1 consumes one of those port IDs, the connection between Switch 1 and Switch 0 may have fewer additional wires (e.g., only six bits) to transmit the remaining port ID to Switch 0. In this example, Switch 1 does not perform any route look up routing, and thus, does not need routing tables.

Switch 0 performs look-ahead routing for Switch 3 (port 2) and Switch 6 (port 2). Again, the connection between Switch 0 and Switch 3 includes additional wires for transmitting the two port IDs while the connection between Switch 3 and switch 6 includes additional wires for transmitting a single port ID. Switch 3 does not perform any route look up routing, and thus, does not need routing tables. Switch 6 then performs route lookup for Switch 9 (port 2), and use such, Switch 9 does not need routing tables.

FIG. 6 illustrates a tradeoff where the switches 130 without hashing (e.g., Switches 1, 3, 5, 7, 9, and 11) do not perform route lookup (either for themselves or a downstream switch), and thus, can have less circuitry and take up less space in the NoC 600. On the other hand, the connections between the switches have additional wires for transmitting the port IDs. Thus, a compiler, when configuring the NoC 600 may determine an optimized balance between the number of hops the switches 130 perform look-ahead routing and the additional wires used in the connections between the switches.

While FIG. 6 illustrates half the switches performing look-ahead routing for two hops in the NoC 600, in other embodiments a subset of the switches may perform look-ahead routing for three or four hops. Further, as mentioned above, the switches that perform look-ahead routing may do it for different numbers of hops. For example, a first switch in the NoC may perform look-ahead routing for four hops (and forward four port Ds) while another switch in the same data path may perform look-ahead routing for only two hops (and forward two port IDs).

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit, comprising:
a first hardware entity;
a second hardware entity; and
a network on chip (NoC) providing connectivity between the first and second hardware entities, the NoC comprising:
an ingress logic block coupled to the first hardware entity;
an egress logic block coupled to the second hardware entity; and
a plurality of switches coupled between the ingress and egress logic blocks, wherein at least one of the ingress logic block or one of the plurality of switches is configured to:
perform look-ahead routing for a downstream switch located directly after the at least one of the ingress logic block or the one of the plurality of switches by providing a port identification (ID) to the downstream switch to instruct the downstream switch to use a specific port to forward a packet without having the downstream switch itself select the specific port to perform route lookup for the packet.

2. The integrated circuit of claim 1, wherein the packet is transmitted using a main channel while the port ID is transmitted using a secondary channel.

3. The integrated circuit of claim 1, wherein the downstream switch is configured to:
perform a first function on the packet;
perform look-ahead routing by determining another port ID for a second downstream switch to use when forwarding the packet, wherein the downstream switch performs the first function in parallel with the look-ahead routing; and
forward the another port ID and the packet to the second downstream switch.

4. The integrated circuit of claim 3, wherein the first function is at least one of arbitration for the packet or quality of service (QoS) for the packet.

5. The integrated circuit of claim 3, wherein the downstream switch forwards the packet to the second downstream switch using a port corresponding to the port ID received from the ingress logic block or one of the plurality of switches.

6. The integrated circuit of claim 1, wherein performing look-ahead routing further comprises determining multiple port IDs for multiple downstream switches to use when forwarding the packet, wherein the multiple port IDs are forwarded to the downstream switch.

7. The integrated circuit of claim 6, wherein the downstream switch is configured to:
determine a port to use when forwarding the packet to a second downstream switch using one of the multiple port IDs; and
forward, using the port, the packet and a second one of the multiple port IDs to the second downstream switch.

8. The integrated circuit of claim 7, wherein clock cycle time is reduced by preventing the downstream switch from performing route lookup for itself.

9. The integrated circuit of claim 7, wherein the second downstream switch is configured to:
determine a port to use when forwarding the packet to a third downstream switch using the second one of the multiple port IDs;
perform look-ahead routing by determining a third port ID for the third downstream switch to use when forwarding the packet, wherein, when performing look-ahead routing, the second downstream switch determines a different number of port IDs than the ingress logic block or one of the plurality of switches; and
forward the third port ID and the packet to the third downstream switch.

10. The integrated circuit of claim 1, wherein at least one of the plurality of switches that is downstream from the downstream switch is configured to:
receive the packet;
perform lookup routing using the packet to determine a port to forward the packet; and
forward the packet using the port.

11. A method, comprising:
providing a network on chip (NoC) in an integrated circuit, the NoC comprising a plurality of switches connecting ingress logic blocks to egress logic blocks;
receiving a packet at a first network element in the NoC, the first network element comprising one of the ingress logic blocks or one of the plurality of switches; and performing look-ahead routing at the first network element for a downstream switch located directly after the first network element by providing a port identification (ID) to the downstream switch to instruct the downstream switch to use a specific port to forward a packet without having the downstream switch itself select the specific port to perform route lookup for the packet.

12. The method of claim 11, wherein the packet is transmitted using a main channel while the port ID is transmitted using a secondary channel.

13. The method of claim 11, further comprising:
performing, at the downstream switch, a first function on the packet;
performing, at the downstream switch, look-ahead routing by determining another port ID for a second downstream switch to use when forwarding the packet, wherein the downstream switch performs the first function in parallel with the look-ahead routing; and
forwarding the another port ID and the packet to the second downstream switch from the downstream switch.

14. The method of claim 13, wherein the first function is at least one of arbitration for the packet or quality of service (QoS) for the packet.

15. The method of claim 11, wherein performing look-ahead routing at the first network element further comprises determining multiple port IDs for multiple downstream switches to use when forwarding the packet, wherein the multiple port IDs are forwarded to the downstream switch.

16. The method of claim 15, further comprising:
determining, at the downstream switch, a port to use when forwarding the packet to a second downstream switch using one of the multiple port IDs; and
forwarding, using the port, the packet and a second one of the multiple port IDs to the second downstream switch.

17. The method of claim 16, wherein clock cycle time is reduced by preventing the downstream switch from performing route lookup for itself.

18. The method of claim 16, further comprising:
determining, at the second downstream switch, a port to use when forwarding the packet to a third downstream switch using the second one of the multiple port IDs;
performing, at the second downstream switch, look-ahead routing by determining a third port ID for the third downstream switch to use when forwarding the packet, wherein, when performing look-ahead routing, the second downstream switch determines a different number of port IDs than the first network element; and
forwarding the third port ID and the packet to the third downstream switch from the second downstream switch.

19. The method of claim 11, further comprising:
receiving the packet at a first switch of the plurality of switches that is downstream from the downstream switch;
performing, at the first switch, lookup routing using the packet to determine a port to forward the packet; and
forwarding, at the first switch, the packet.

20. An integrated circuit, comprising:
a network on chip (NoC) comprising:
   an ingress logic block;
   an egress logic block; and
   a plurality of switches coupled between the ingress and egress logic blocks, wherein at least one of the ingress logic block or one of the plurality of switches is configured to:
      perform look-ahead routing for a downstream switch located directly after the at least one of the ingress logic block or the one of the plurality of switches by providing a port identification (ID) to the downstream switch to instruct the downstream switch to use a specific port to forward a packet without having the downstream switch itself select the specific port to perform route lookup for the packet.

* * * * *